(12) United States Patent
Ali et al.

(10) Patent No.: US 11,951,457 B2
(45) Date of Patent: Apr. 9, 2024

(54) METAL-SILICA NANOCOMPOSITES PREPARED THROUGH A SINGLE STEP SOLUTION COMBUSTION SYNTHESIS (SCS)

(71) Applicant: QATAR UNIVERSITY, Doha (QA)

(72) Inventors: Sardar Ali, Doha (QA); Dharmesh Kumar, Doha (QA); Ahmed Gamal, Doha (QA); Mahmoud M. Khader, Doha (QA); Muftah El-Naas, Doha (QA)

(*) Notice: Subject to any disclaimer, the term of this patent is extended or adjusted under 35 U.S.C. 154(b) by 20 days.

(21) Appl. No.: 17/568,657

(22) Filed: Jan. 4, 2022

(65) Prior Publication Data
US 2022/0212175 A1 Jul. 7, 2022

Related U.S. Application Data

(60) Provisional application No. 63/133,637, filed on Jan. 4, 2021.

(51) Int. Cl.
B01J 23/755 (2006.01)
B01J 21/08 (2006.01)
(Continued)

(52) U.S. Cl.
CPC ............ B01J 23/755 (2013.01); B01J 21/08 (2013.01); B01J 35/0013 (2013.01);
(Continued)

(58) Field of Classification Search
CPC ...... B01J 23/755; B01J 21/08; B01J 35/0013; B01J 35/023; B01J 37/036; B01J 37/04; B01J 37/082
(Continued)

(56) References Cited

U.S. PATENT DOCUMENTS 3,207,702 A * 9/1965 Shalit .................... B01J 23/70
502/237
3,351,566 A 11/1967 Taylor et al.
(Continued)

FOREIGN PATENT DOCUMENTS

CN 102527390 A * 7/2012 ............ B01J 23/755
CN 111215073 A * 6/2020 ............ B01J 23/755
(Continued)

OTHER PUBLICATIONS

Marina A. Ermakova et al., "High-loaded nickel-silica catalysts for hydrogenation, prepared by sol-gel Route: structure and catalytic behavior", Science Direct, Aplied Catalysis A: General 245 (2003) 277-288, www.elsevier.com/locate/apcata, DOI: 10.1016/S0926-860X(02)00648-8, 12 pages.
(Continued)

Primary Examiner — Patricia L. Hailey
(74) Attorney, Agent, or Firm — Squire Patton Boggs (US) LLP

(57) ABSTRACT

Provided herein is a novel silica-supported nickel nanocomposite and a novel one-pot solution combustion synthesis of that nanocomposite. The method allows the synthesis of small size nickel nanoparticles (e.g., 3 nm to 40 nm) for which a considerable percentage of nickel is inserted into silica, experiencing strong metal-support interaction. These exceptional physicochemical properties make them desirable for various industrial applications, such as electronic, heterogeneous catalysis as well as conversion and storage of energy.

21 Claims, 11 Drawing Sheets

(51) Int. Cl.
　　　*B01J 35/00*　　　(2006.01)
　　　*B01J 35/02*　　　(2006.01)
　　　*B01J 37/03*　　　(2006.01)
　　　*B01J 37/04*　　　(2006.01)
　　　*B01J 37/08*　　　(2006.01)

(52) U.S. Cl.
　　　CPC .......... *B01J 35/023* (2013.01); *B01J 37/036* (2013.01); *B01J 37/04* (2013.01); *B01J 37/082* (2013.01)

(58) Field of Classification Search
　　　USPC .................. 502/237, 233, 259, 337; 516/111
　　　See application file for complete search history.

(56) References Cited

U.S. PATENT DOCUMENTS

| | | | |
|---|---|---|---|
| 3,697,445 | A | 10/1972 | Carter |
| 4,113,658 | A | 9/1978 | Geus |
| 6,992,039 | B2 * | 1/2006 | Jiang ...................... B01J 37/031 502/262 |

FOREIGN PATENT DOCUMENTS

| | | | | |
|---|---|---|---|---|
| JP | 2005254091 | A * | 9/2005 | ............ B01J 23/755 |
| WO | WO-2014070116 | A1 * | 5/2014 | .............. B01J 23/42 |

OTHER PUBLICATIONS

Allison Cross et al., "In Situ Preparation of Highly Stable Ni-Based Supported Catalysts by Solution Combustion Synthesis", The Journal of Physical Chemistry C 2014, 118, 26191-26198, pubs.acs.org/JPCC, dx.doi.org/10.1021/jp508546n, 8 pages.

Zhicheng Liu et al., "Highly dispersed nickel loaded on mesoporous silica: One-spot synthesis strategy and high performance as catalysts for methane reforming with carbon dioxide", Applied Catalysis B: Environmental 125 (2012) 324-330, www.elsevier.com/locate/apcatb, http://dx.doi.org/10.1016/j.apcatb.2012.06.003, 7 pages.

Khachatur V. Manukyan et al., "Combustion Synthesis of Ni-SiO2 Nanoscale Materials", Microsc. Microanal. 23 (Suppl 1), 2017, Microscopy Society of America 2017, 1866-1867; doi:01.1017/S1431927617009990, 2 pages.

Xianliang Qiao et al., "One-pot synthesis of porous silica-supported ultrafine Ni nanoparticles as efficient and stable catalyst for selective hydrogenation of benzophenone", Applied Catalysis B: Environmental 259 (2019) 118111, www.elsevier.com/locate/apcatb, https://doi.org/10.1016/j.apcatb.2019.118111, 10 pages.

Yan Xu et al., "A Facile Fabrication of Supported Ni/SiO2 Catalysts for Dry Reforming of Methane with Remarkably Enhanced Catalytic Performance", Catalysts 2019, 9, 183, 9 pages.

* cited by examiner

METAL-SILICA NANOCOMPOSITES PREPARED THROUGH A SINGLE STEP SOLUTION COMBUSTION SYNTHESIS (SCS)

CROSS-REFERENCE TO RELATED APPLICATIONS

This application claims priority to and the benefit of, under 35 U.S.C. § 119(e), U.S. Provisional Application No. 63/133,637, entitled "METAL-SILICA NANOCOMPOSITES PREPARED BY SINGLE STEP SOLUTION COMBUSTION SYNTHESIS (SCS) METHOD" and filed on Jan. 4, 2021, the content of which is incorporated by reference in its entirety herein.

TECHNICAL FIELD

Provided herein are compositions and methods related to a nickel nanocomposite (i.e., a composition of transition metal composite) supported on silica. In some preferred aspects and embodiments, the compositions are prepared by a single-step solution combustion synthesis.

BACKGROUND OF THE INVENTION

Fabrication of transition-metal-based composite nanomaterials are of high interest for many industrial applications, such as conversion and storage of energy, heterogeneous catalysts, and electronics. However, it has been demonstrated in various reports that transition metal nanoparticles tend to agglomerate into larger particles. This is because of two main factors: firstly, application of these materials at high temperatures; and secondly, the requirement of high metal loadings (>50 wt %).

Therefore, there is a continuing need for effective methods of preparing transition metal (e.g., nickel) nanocomposites compositions at high metal loading and with little or no agglomeration, as well as for the compositions produced by these methods.

SUMMARY OF THE INVENTION

Provided herein are compositions and methods of synthesis directed to silica supported metal-based nanomaterials/catalysts (i.e., nanocomposites) with a nanoparticle average size range of below 3 nm (e.g., about 3 nm) to 100 nm, preferably between about 3 nm to 40 nm. In certain preferred embodiments, the compositions possess novel and useful physicochemical properties, such as the interactions of the nickel oxide nanoparticles with their silica matrix and the specific nickel oxide surface area.

In certain aspects and embodiments, provided herein is a method of fabricating a silica matrix comprising dispersed nickel oxide nanoparticles (i.e., a nanocomposite comprising nickel oxide supported on silica), the method comprising:
heating a combustion synthesis solution to form a gel, wherein the combustion synthesis solution comprises a silica source, a metal precursor salt, a fuel, and an alcohol;
heating the gel to form a crude silica matrix; and
calcining the crude silica matrix.

In certain preferred embodiments, the method is a single step combustion synthesis (e.g., in a batch size of 10 to 30 g).

In certain embodiments, the method further comprises:
combining a first solution and a second solution to form the combustion synthesis solution, wherein the first solution comprises the silica source and the alcohol, and wherein the second solution comprises the metal precursor salt and the fuel.

In certain embodiments, the silica source is an orthosilicate alkyl ester (e.g., tetraethyl orthosilicate), an alkoxide organosilane (e.g., triethoxy octyl silane), or a silica particulate (e.g., fumed silica). In certain embodiments, the metal precursor salt is s nickel nitrate hexahydrate. In certain embodiments, the alcohol is selected from methanol, ethanol, n-propanol, and isopropanol (e.g., n-propanol). In certain embodiments, the fuel is selected from glycine, urea, hydrazine, a hydrazide, a glycol, and citric acid (e.g., glycine).

In certain embodiments, the heating of the combustion synthesis solution is at about 110° C. In certain embodiments the calcining is at about 600° C.

In certain aspects and embodiments, the silica matrix has a loading of nickel oxide from about 5 to 85 wt %. In certain embodiments, the loading of nickel oxide is from about 10 to 70% wt %.

In certain aspects and embodiments, the dispersed nickel oxide nanoparticles have an average particle size of from about 2 nm to 40 nm. In certain embodiments, the average particle size is from about 3 nm to 15 nm.

In certain embodiments, the combustion synthesis solution includes a ratio of fuel to metal precursor salt of from about 0.04 to 0.4 (e.g., about 0.85).

In certain aspects and embodiments, provided herein are nanocomposite compositions comprising a silica matrix and nickel oxide nanoparticles, wherein the nickel oxide nanoparticles are dispersed in the silica matrix, and wherein the nanocomposite composition is prepared by a method of the present invention.

BRIEF DESCRIPTION OF THE FIGURES

FIG. 8 shows the results for 10 wt % Ni supported on silica with TEOS as the silica source and with ethanol as the solvent. For 10 wt % $Ni/SiO_2$ with TEOS as the silica source, (i) the particle size decreased with an increase in G/N molar ratio, (ii) smaller particle size was achieved at a G/N ratio of 0.178, and (iii) the particle size increased from 4.6 nm to 6.4 nm when methanol was used instead of ethanol.

FIG. 9 shows the results for 70 wt % Ni supported on silica with TEOS as the silica source and with ethanol as the solvent. For 70 wt % $Ni/SiO_2$ with TEOS as the silica source, the particle size decreased with the increase in G/N ratio to 0.085 and increased again with at higher G/N ratio.

FIG. 9 shows the results for 70 wt % Ni supported on silica with TEOS as the silica source, a G/N ratio of 0.085, and equimolar amounts of the various alcohols.

Figure 1:
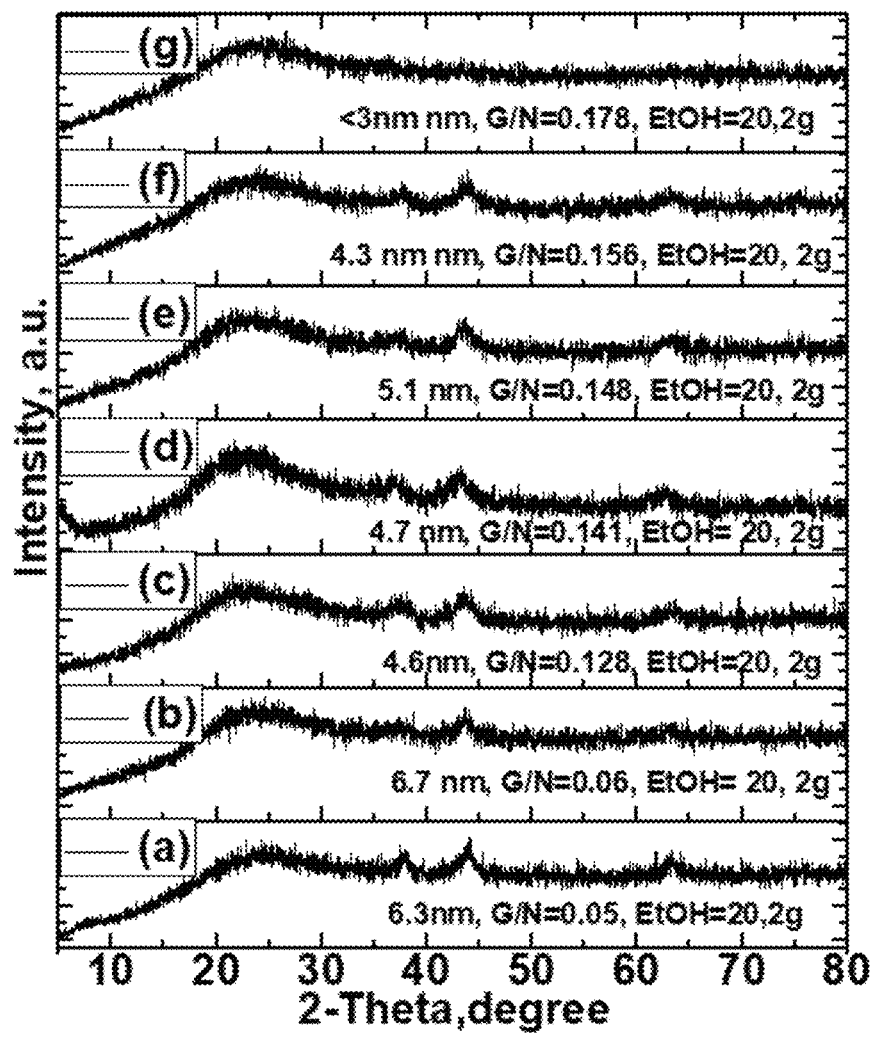
FIG. 1 shows X-ray diffraction (XRD) patterns of nanomaterials with 10 wt % nickel/silica (TEOS), demonstrating the manufacturing of materials in the size range between 6.7 nm and 3 nm and prepared at various glycine to nitrate oxidant (G/N) ratios. The G/N ratios were adjusted by varying the amount of additional $NH_4NO_3$ added into the combustion mixture. Particle size decreased with an increase in G/N molar ratio, with a smaller particle size achieved at a G/N ratio of 0.178.

These figures provide results from illustrative embodiments of the present invention, which are described below.

DETAILED DESCRIPTION

Provided herein are compositions and methods directed to silica-supported nickel-based composite nanomaterials, which may be prepared by a single step solution combustion synthesis (SCS).

In certain aspects and embodiments, the present invention sets forth a simple method for the synthesis of silica supported metal-based nanomaterials/catalysts with a nanoparticle size range of below 3 nm (e.g., about 3 nm) to 100 nm, preferably between 3 nm to 40 nm, with unique physicochemical properties, such as interactions with silica matrix and specific nickel oxide surface area.

Definitions

When referring to the compounds provided herein, the following terms have the following meanings unless indicated otherwise. Unless defined otherwise, all technical and scientific terms used herein have the same meaning as is commonly understood by one of ordinary skill in the art. In the event of a plurality of definitions for a term herein, those in this section apply unless stated otherwise.

As used herein, "a," "an," or "the" can include not only includes aspects and embodiments with one member, but also aspects and embodiments with more than one member. For example, an aspect comprising "a metal selected from the group consisting of X, Y, and Z" may present embodiments comprising X, Y, Z, X in combination with Y, Y in combination with Z, X in combination with Z, or all three (X, Y, and Z) in combination.

The term "about" as used herein to modify a numerical value indicates a defined range around that value. If "X" were the value, "about X" would generally indicate a value from 0.95X to 1.05X. Any reference to "about X" specifically indicates at least the values X, 0.95X, 0.96X, 0.97X, 0.98X, 0.99X, 1.01X, 1.02X, 1.03X, 1.04X, and 1.05X. Thus, "about X" is intended to teach and to prvide written description support for a claim limitation of, e.g., "0.98X."

When the term "about" is applied to the beginning of a numerical range, it applies to both ends of the mage. Thus, "from about 10 wt % to 70 wt %" is equivalent to "from about 10 wt % to about 70 wt %." When "about" is applied to the first value of a set of values, it applies to all values in that set. Thus, "about 10, 40, or 70 wt %" is equivalent to "about 10 wt %, about 40 wt %, or about 70 wt %."

The term "alkyl" as used herein, and unless otherwise specified, refers to a saturated straight or branched hydrocarbon. In certain embodiments, the alkyl group is a primary, secondary, or tertiary hydrocarbon. In certain embodiments, the alkyl group includes one to ten carbon atoms, i.e., $C_1$ to $C_{10}$ alkyl. In certain embodiments, the alkyl group includes one to ten carbon atoms, i.e., $C_1$ to $C_{10}$ alkyl. In certain embodiments, the alkyl group is selected from the group consisting of methyl, $CF_3$, $CCl_3$, $CFCl_2$, $CF_2C_1$, ethyl, $CH_2CF_3$, $CF_2CF_3$, propyl, isopropyl, butyl, isobutyl, secbutyl, t-butyl, pentyl, isopentyl, neopentyl, hexyl, isohexyl, 3-methylpentyl, 2,2-dimethylbutyl, and 2,3-dimethylbutyl.

The term "lower alkyl" as used herein, and unless otherwise specified, refers to a saturated straight or branched hydrocarbon having one to six carbon atoms, i.e., $C_1$ to $C_6$ alkyl. In certain embodiments, the lower alkyl group is $C_1$ to $C_4$ alkyl. In certain embodiments, the lower alkyl group is $C_1$ to $C_3$ alkyl. In certain preferred embodiments, the alkyl group is lower alkyl.

"Halogen" or "halo" refers to chloro, bromo, fluoro or iodo (and preferably, fluoro or chloro).

"Hydrate" refers to a solvate in which the solvent included is water (e.g., nickel nitrate hexahydrate).

The term "or" as used herein should in general be construed non-exclusively (i.e., "or" is the Boolean operator "or," not the disjunction between mutually exclusive alternatives). For example, an embodiment of "a composition comprising A or B" would typically present an aspect with a composition comprising both A and B. "Or," should, however, be construed to exclude aspects presented that cannot be combined without contradiction (e.g., a nanoparticulate composition with NiO loading of 45 wt % or 65 wt %).

The term "solvate" as used herein, and unless otherwise specified, is a compound provided herein, or a salt thereof, that further includes a stoichiometric or non-stoichiometric amount of solvent bound by non-covalent intermolecular forces. Where the solvent is water, the solvate is a hydrate (e.g., nickel nitrate hexahydrate).

As used herein, "nanoparticles" refer to materials where all the dimensions of the materials are measured within the nanoscale (i.e., a size of below 3 nm, such as about 1, 2, or 3 nm, to a size of 100 nm). For example, in certain embodiments, no dimension of the material is larger than 100 nm.

As used herein, a "nanoparticulate" composition is a composition comprising nanoparticles. In certain preferred embodiments, the composition further comprises a support material (e.g., silica) into which at least some of the nanoparticles are dispersed.

The term "wt %" means a percentage by weight, which is expressed as 100 multiplied by the ratio of the weight of the ingredient to the total weight of the composition. As a default unless indicated otherwise, the percentages disclosed herein are wt %.

Methods

In certain embodiments, provided herein are methods of fabricating a silica matrix comprising dispersed nickel oxide nanoparticles, the method comprising:

heating a combustion synthesis solution to form a gel, wherein the combustion synthesis solution comprises a silica source, a metal precursor salt, a fuel, and an alcohol;

heating the gel to form a crude silica matrix; and calcining the crude silica matrix.

In certain preferred embodiments, the method is a single step combustion synthesis. In certain embodiments, the single step combustion synthesis is in a batch size of 10 to 30 g.

In certain embodiments, the loading of nickel oxide is from about 5 to 85 wt % (e.g., 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 92, 92, or 93 wt %). In certain embodiments, the loading of nickel oxide is from about 7 to 80 wt %. In certain embodiments, the loading of nickel oxide is from about 10 to 70 wt %.

In certain embodiments, the method further comprises:

combining a first solution and a second solution to form the combustion synthesis solution, wherein the first solution comprises the silica source and the alcohol, and wherein the second solution comprises the metal precursor salt and the fuel.

In certain embodiments, the silica source is an orthosilicate alkyl ester or a silica particulate. In certain embodiments, the silica source is an orthosilicate alkyl ester, an alkoxide organosilane, or a silica particulate. In certain embodiments, the orthosilicate alkyl ester is tetraethyl orthosilicate. In certain embodiments, the orthosilicate alkyl ester is tetramethyl orthosilicate. In certain embodiments, the alkoxide organosilane is triethoxy octyl silane. In certain embodiments, the silica particulate is fumed silica.

In some embodiments, the amount of tetraethyl orthosilicate (TEOS) used is between about 0.1 and 100 g (e.g., 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.2, 2.5, 2.8, 3.0, 3.2, 3.5, 3.8, 4.0, 4.2, 4.5, 4.8, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, and 110 g). In some embodiments, the amount of TEOS used is between about 1 and 100 g. In some embodiments, the amount of TEOS used is between about 1 and 50 g. In some embodiments, the amount of TEOS used is between about 1 and 25 g. In some embodiments, the amount of TEOS used is between about 1 and 10 g.

In some embodiments the amount of fumed silica used is between about 0.1 and 100 g (e.g., 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.2, 2.5, 2.8, 3.0, 3.2, 3.5, 3.8, 4.0, 4.2, 4.5, 4.8, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, and 110 g). In some embodiments, the amount of fumed silica used is between about 1 and 100 g. In some embodiments, the amount of fumed silica used is between about 1 and 50 g. In some embodiments, the amount of fumed silica used is between about 1 and 25 g. In some embodiments, the amount of fumed silica used is between about 1 and 10 g.

In certain embodiments, the metal precursor salt is a metal nitrate (e.g., a nickel nitrate, such as nickel nitrate hexahydrate).

In some embodiments, the amount of nickel nitrate hexahydrate used is between about 0.1 and 100 g (e.g., 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.2, 2.5, 2.8, 3.0, 3.2, 3.5, 3.8, 4.0, 4.2, 4.5, 4.8, 5.0, 5.5, 6.0, 6.5, 7.0, 7.5, 8.0, 8.5, 9.0, 9.5, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, and 110 g). In some embodiments, the amount of nickel nitrate hexahydrate used is between about 1 and 100 g. In some embodiments, the amount of nickel nitrate hexahydrate used is between about 1 and 50 g. In some embodiments, the amount of nickel nitrate hexahydrate used is between about 1 and 25 g. In some embodiments, the amount of nickel nitrate hexahydrate used is between about 1 and 10 g.

In certain embodiments, the alcohol is selected from the group including methanol, ethanol, n-propanol, and isopropanol. In certain preferred embodiments, the alcohol is n-propanol.

In certain embodiments, the fuel is selected from the group including glycine, urea, hydrazine, a hydrazide, a glycol, and citric acid. In certain preferred embodiments, the fuel is glycine.

In certain embodiments, the heating of the combustion synthesis solution is at about 110° C. In certain embodiments, the calcining is at about 600° C.

In certain embodiments, the loading of nickel oxide on the silica matrix is about 2 to 90 wt % (e.g., 1.8, 2.0, 2.5, 3.0, 3.5, 4.0, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 92, 92, or 93 wt %). In certain embodiments, the loading of nickel oxide is from about 5 to 85 wt %. In certain embodiments, the loading of nickel oxide is from about 7 to 80 wt %. In certain embodiments, the loading of nickel oxide is from about 10 to 70 wt %.

In certain embodiments, the average particle size is from below about 3 nm to 70 nm (e.g., 1, 1.5, 2.0, 2.5, 3.0, 3.5, 4.0, 4.5, 5.0, 5.5, 6.0, 6.5, 6.7, 7.0, 7.5, 8.0, 8.5, 9.0, 9.5, 10.0, 11, 12, 13, 14, 15, 16, 17, 18, 19, 20, 21, 22, 23, 24, 25, 26, 27, 28, 29, 30, 31, 32, 33, 34, 35, 36, 37, 38, 39, 39.5, 40, 41, 42, 43, 44, 45, 56, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, or 77 nm). In certain embodiments, the dispersed nickel oxide nanoparticles have an average particle size of from about 2 nm to 40 nm. In certain embodiments, the average particle size is from about 3 nm to 15 nm (e.g., 1, 1.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, or 16.5 nm). In certain embodiments, the dispersed nickel oxide nanoparticles have an average particle size of from about 3 nm to 6.7 nm. In certain embodiments, the dispersed nickel oxide nanoparticles have an average particle size of from about 6 nm to 23 nm.

In certain embodiments, the combustion synthesis solution includes a ratio of fuel to the metal precursor salt of from about 0.04 to 0.4 (e.g., 0.036, 0.038, 0.040, 0.042, 0.045, 0.048, 0.050, 0.052, 0.055, 0.058, 0.060, 0.062, 0.065, 0.068, 0.070, 0.072, 0.075, 0.078, 0.079, 0.080, 0.081, 0.082, 0.083, 0.084, 0.085, 0.086, 0.087, 0.088, 0.089, 0.090, 0.091, 0.092, 0.095, 0.095, 0.098, 0.100, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, or ranges thereof). In certain preferred embodiments the ratio of fuel to the metal precursor salt is about 0.085 (e.g., 0.076, 0.077, 0.078, 0.079, 0.080, 0.081, 0.082, 0.083, 0.084, 0.085, 0.086, 0.087, 0.088, 0.089, 0.090, 0.091, 0.092, 0.093, or 0.094).

In certain embodiments, the present invention sets forth a method of synthesis of silica-supported nickel nanocomposites with a metal loading in the range of 10 wt % to 70 wt % and with average metal particle size between about 1 to 40 nm (preferably, 3 nm to 15 nm). In certain embodiments, the method is for a compact batch size of 10-30 g.

In certain aspects and embodiments, the instant invention relates to a process of synthesis of silica supported nickel nanocomposites where nickel is induced into a silica matrix. In certain preferred embodiments, the nickel is incorporated into the silica matrix as dispersed nickel oxide nanoparticles. The results of the analytical techniques of hydrogen temperature programmed reduction (H2-TPR), and X-ray photoelectron spectroscopy (XPS) have demonstrated that Ni is present as both NiO and Ni-inserted within the silica matrix.

In certain embodiments, the methods of the instant invention allow the controlling and stabilizing of the NiO nanoparticles supported on silica by a combustion synthesis method, in which a significant amount of heat is generated during the synthesis process. This is accomplished by the variance and optimization of parameters that may include, e.g., the fuel:oxidant (e.g., glycine:nitrate or G/N) ratio, the source of silica, and the use of an appropriate alcohol.

In certain embodiments, the method allows controlling the particle size of nickel oxide by varying the fuel:oxidant (e.g., glycine:nitrate) ratio. For example, a higher G/N ratio resulted in higher insertion of nickel species within the silica matrix.

In certain embodiments, the method allows controlling the particle size of nickel oxide by varying the source of silica (e.g., by using two different sources of $SiO_2$). For the same loading of nickel oxide (e.g., 70 wt %) for a 10-30 g batch, TEOS provided a smaller average particle size (i.e., 8 nm) than for fumed silica (i.e., average particle size of 15 nm). Using TEOS as a silica source also favored a higher insertion of Ni within the silica matrix as compared with fumed silica.

In certain embodiments, the method also allows controlling the particle size of nickel oxide by the choice of alcohol for the synthesis, with propanol favoring smaller particle sizes as compared to ethanol and methanol.

Compositions

In certain embodiments, provided herein are nanocomposite composition comprising a silica matrix and nickel oxide nanoparticles, wherein the nickel oxide nanoparticles are dispersed in the silica matrix (e.g., as the support), and wherein the composition is prepared by any of the methods of the instant invention.

In certain embodiments, the loading of nickel oxide on the silica matrix is about 2 to 90 wt % (e.g., 1.8, 2.0, 2.5, 3.0, 3.5, 4.0, 4.5, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 92, 92, or 93 wt %). In certain embodiments, the loading of nickel oxide is from about 5 to 85 wt %. In certain embodiments, the loading of nickel oxide is from about 7 to 80 wt %. In certain embodiments, the loading of nickel oxide is from about 10 to 70 wt %.

In certain embodiments, the average particle size is from below about 3 nm to 70 nm (e.g., 1, 1.5, 2.0, 2.5, 3.0, 3.5, 4.0, 4.5, 5.0, 5.5, 6.0, 6.5, 6.7, 7.0, 7.5, 8.0, 8.5, 9.0, 9.5, 10.0, 11, 12, 13, 14, 15, 16, 17, 18, 19, 20, 21, 22, 23, 24, 25, 26, 27, 28, 29, 30, 31, 32, 33, 34, 35, 36, 37, 38, 39, 39.5, 40, 41, 42, 43, 44, 45, 56, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, or 77 nm). In certain embodiments, the dispersed nickel oxide nanoparticles have an average particle size of from about 2 nm to 40 nm. In certain embodiments, the average particle size is from about 3 nm to 15 nm (e.g., 2.7, 3.0, 3.5, 4.0, 4.5, 5.0, 5.5, 6.0, 6.5, 6.7, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, or 16.5 nm). In certain embodiments, the dispersed nickel oxide nanoparticles have an average particle size of from about 3 nm to 6.7 nm. In certain embodiments, the dispersed nickel oxide nanoparticles have an average particle size of from about 6 nm to 23 nm.

Methods of Use

The properties of the instant compositions make them useful materials for various industrial and technological applications in various industries. The material disclosed in the present invention can specifically be employed as a catalyst for various industrial processes, specifically hydrogenation reactions. Examples include hydrogenation of xylenes, hydrogenation of acetophenone, pyrolysis gasoline up gradation by hydrogenation and hydrogenation of benzene, and the like.

In certain embodiments, the compositions and methods of the present invention present advantages that include:

(1) a smaller particle size with good distribution;

(2) induction of nickel species into the silica matrix (e.g., about 17 to 30% as per XPS results), which are essential to make it resilient to sintering and would be useful for high temperature applications; and (3) strong metal to support interactions (SMI) (e.g., for about 21 to 28% of Ni species as per XPS analysis results), which helps to stabilize the Ni particles and to resist deactivation by surface migration and sintering.

EXAMPLES

As used herein, the symbols and conventions used in these processes, schemes and examples, regardless of whether a particular abbreviation is specifically defined, are consistent with those used in the contemporary scientific literature, for example, the Journal of the American Chemical Society. Specifically, but without limitation, the following abbreviations may be used in the examples and throughout the specification: EtOH (ethanol), g (grams), HRTEM (high resolution transmission electron microscopy), MeOH (methanol), mL (milliliters), Ni (nickel), NiO (nickel oxide), nm (nanometers), TEOS (tetraethyl orthosilicate), TPR (temperature programmed reduction), and XRD (X-ray diffraction).

For all of the following examples, standard work-up, purification, and analysis methods known to those skilled in the art can be utilized. Unless otherwise indicated, all temperatures are expressed in ° C. (degrees Centigrade). All reactions are conducted at room temperature unless otherwise noted.

Example 1

Representative Procedure

The following is an example of nanomaterial produced according to the method described in the invention. This example is provided for exemplary purposes only and is not intended to limit the scope of the invention.

A solution of TEOS (2.081 g) or fumed silica (0.6 g) in propanol (20 mL) was prepared. In another beaker, nickel nitrate hexahydrate (7 g) and glycine (1.4 g) were dissolved in deionized water (100 mL) and stirred to form a homogeneous mixture. Both of these solutions were then mixed with vigorous shaking on a hot plate using magnetic stirring. The resulting solution was then heated at approximately 110° C. until the slurry turned into a gel. Once combustion initiated, it proceeded in an auto-thermal mode without any external heating source.

After a complete combustion of all precursors, the resultant powder was calcined in air at 600° C. in a muffle furnace for three hours with a heating and cooling ramp of 1° C./min.

Example 2

Characterization of Nanocomposite Materials

The associated figures show the characterization results of the nanocomposite materials synthesized per the methods of the invention. The particle size of metal oxides presented here are calculated from the XRD spectrum of the samples using the Debye-Scherrer equation considering the most intense/mother peak of diffraction.

Figure 2A:
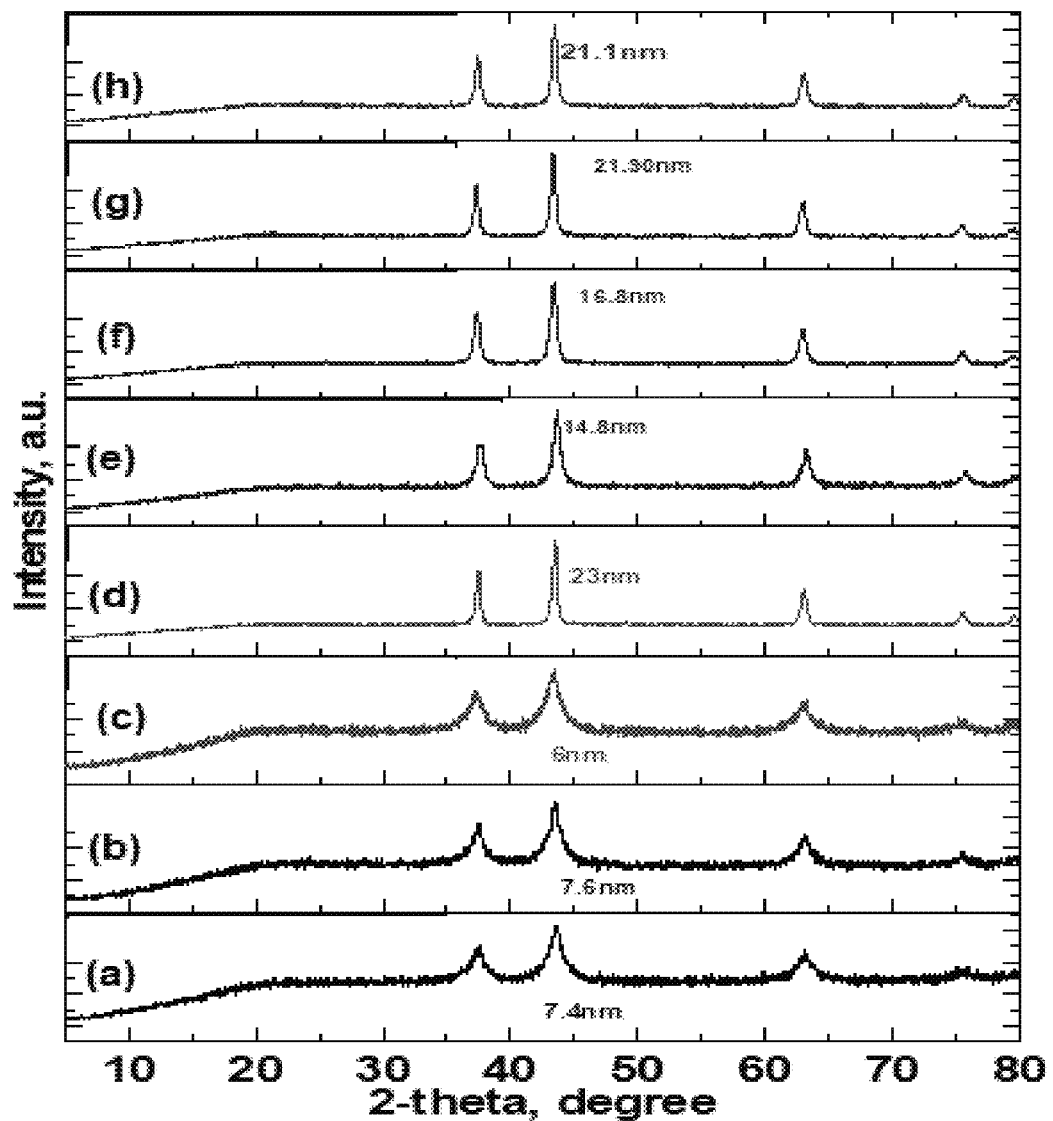
FIG. 2A shows XRD patterns of nanomaterials with 70 wt % nickel content, demonstrating manufacturing of materials in the size range between 23 nm and 6 nm.
Figure 2B:
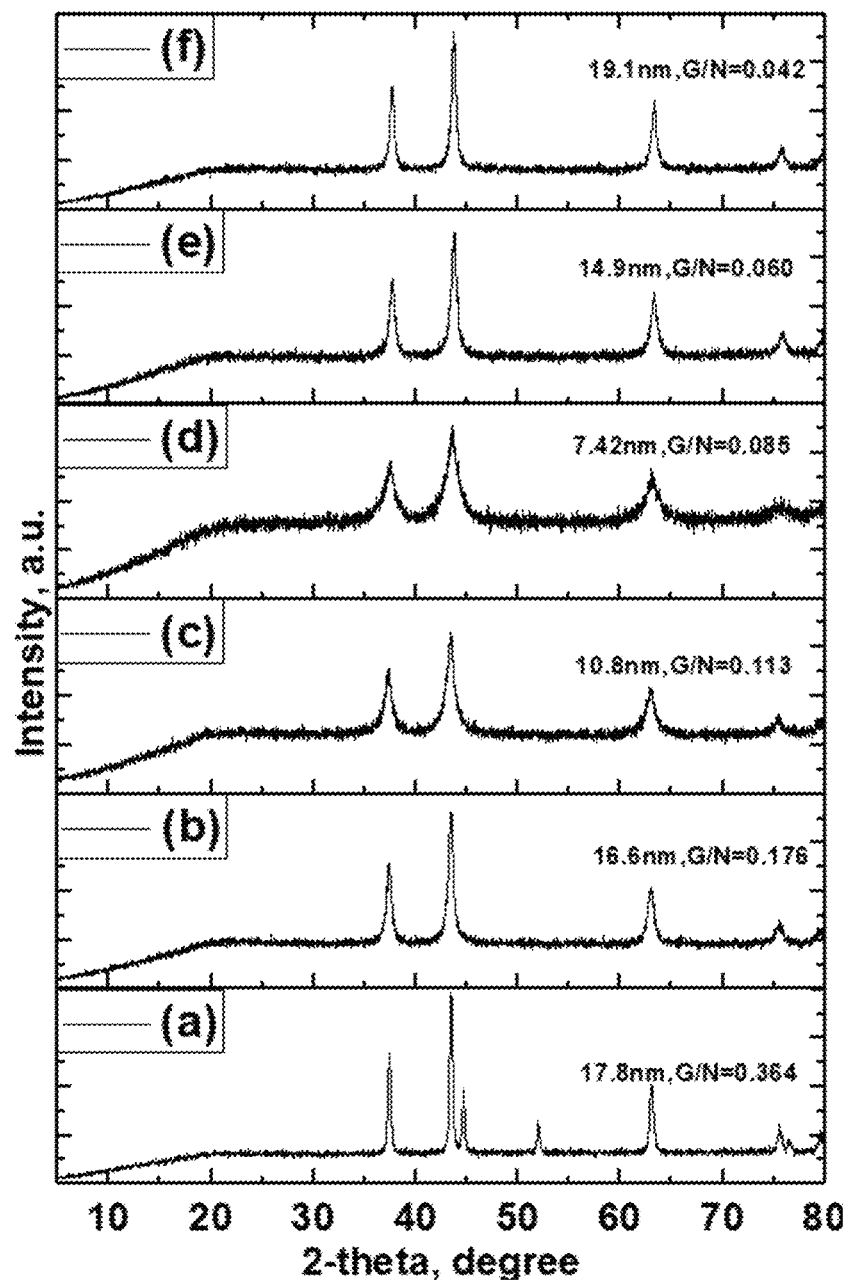
FIG. 2B shows XRD patterns of nanomaterials with 70 wt % nickel/silica (TEOS), demonstrating synthesis of materials in the size range between 7 nm and 20 nm prepared at various glycine to nitrate oxidant ratios. The G/N ratios were adjusted by varying the amount of additional $NH_4NO_3$ added into the combustion mixture.

As shown in FIG. 1, for samples with a metal loading (NiO) of 10 wt %, nanocomposites with metal nanoparticles of a size range between 6.7 nm and 3 nm were prepared As shown in FIG. 2, for samples with a high metal loading of 70 wt %, transition metal nanocomposites with nanoparticles of a size range between 23 nm and 6 nm were prepared.

Figure 3:
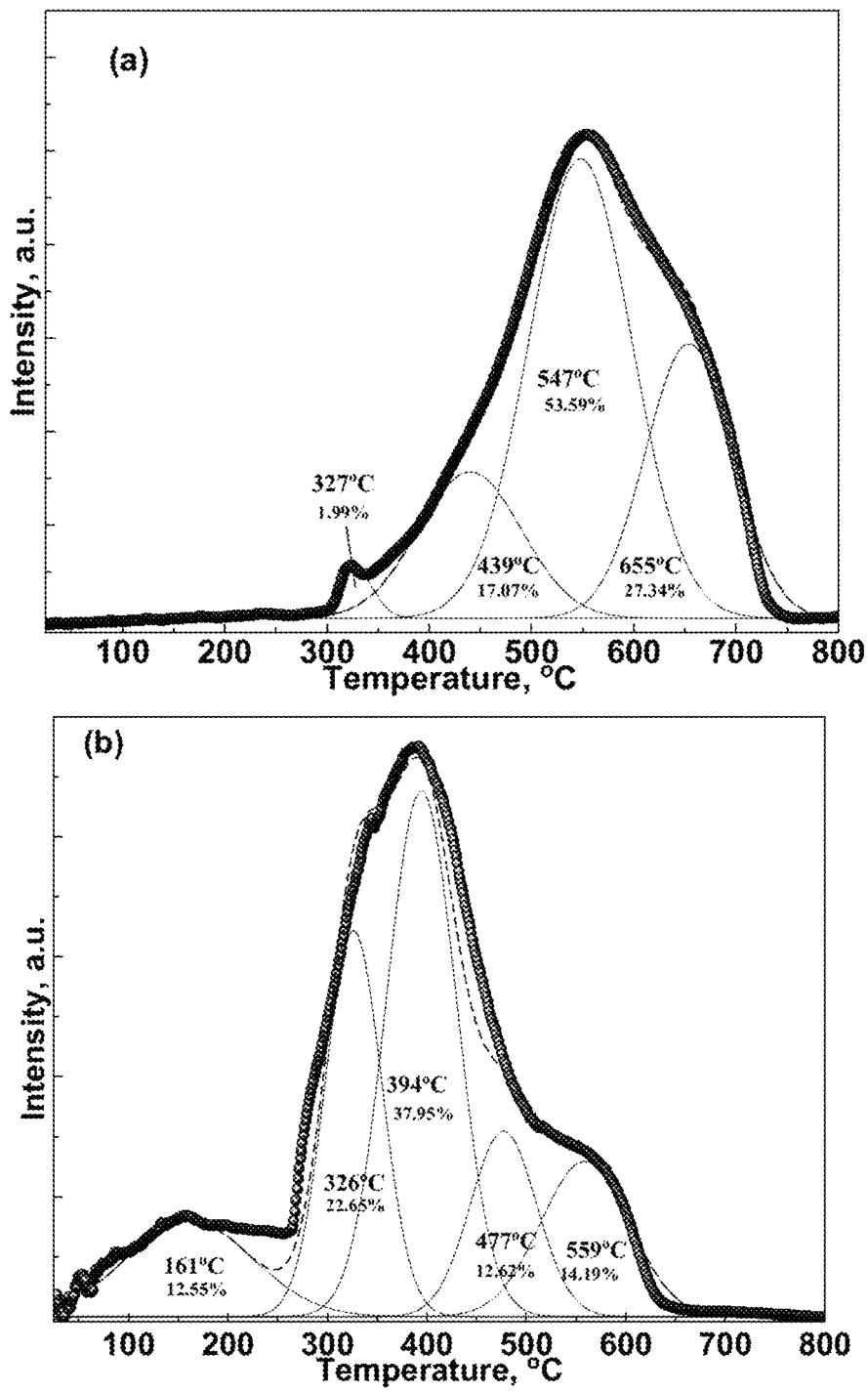
FIG. 3 shows temperature programmed reduction (TPR) profiles of the nanomaterials (a) 10 wt % Ni and (b) 70 wt % Ni. These samples were prepared at a G/N ratio of 0.176 and 0.085, respectively, while TEOS was used as a silica source. The results show stronger metal support interaction and/or induction of nickel moieties into the silica matrix.

As demonstrated in FIG. 3, hydrogen temperature programmed reduction ($H_2$-TPR) profiles revealed that the metal species in the nanocomposite were present in three forms, i.e. (i) loosely dispersed metal particles, (ii) loosely associated metal nanoparticles, and (iii) metal nanoparticles inserted into silica matrix.

Figure 4:
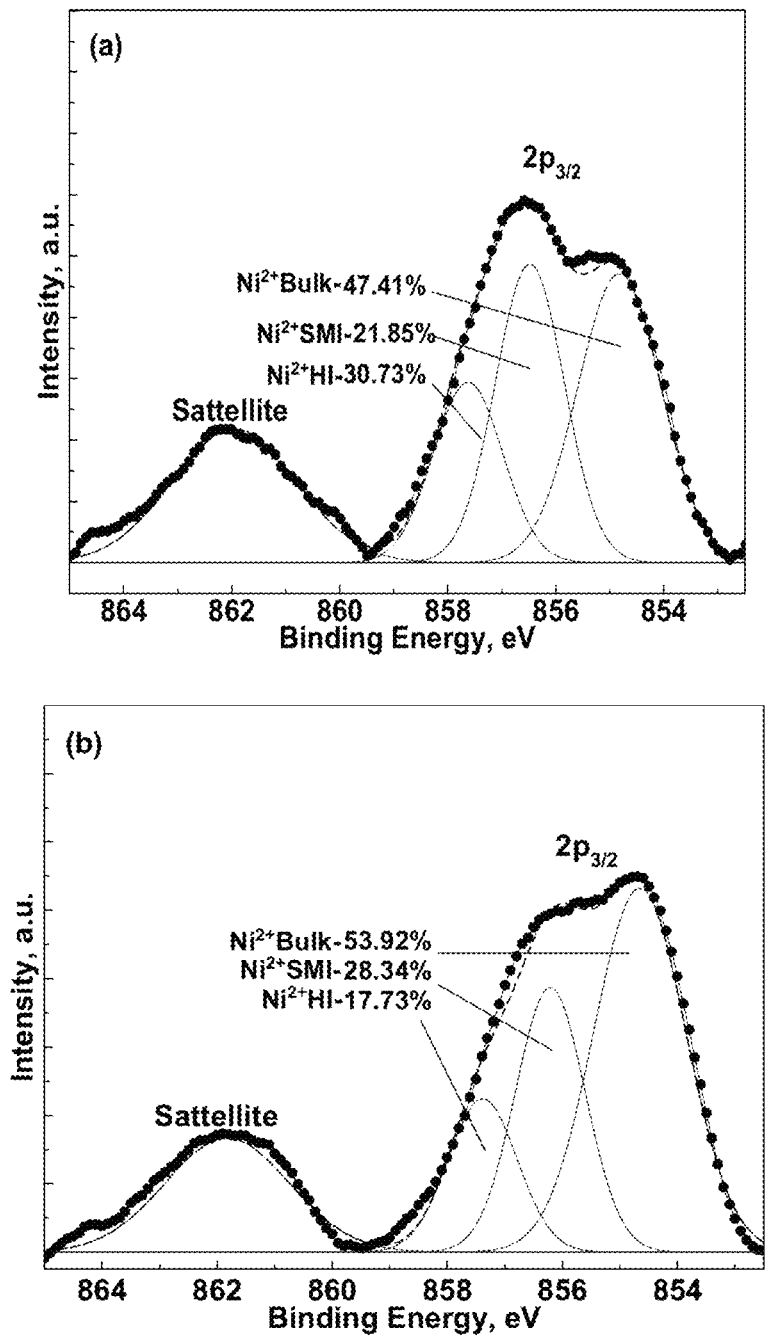
FIG. 4 shows the X-ray photoelectron spectroscopic (XPS) analysis of the nanomaterials diffraction patterns of nanomaterials (a) 10 wt % $Ni/SiO_2$ and (b) 10 wt % $Ni/SiO_2$. These samples were prepared at a G/N ratio of 0.176 and 0.085, respectively, while TEOS was used as the silica source. The results show stronger metal support interaction and/or induction of nickel moieties into the silica matrix.

As demonstrated in FIG. 4, X-ray photoelectron spectroscopic (XPS) analysis of the nanocomposite materials affirmed the findings from the TPR analysis.

Figure 5:
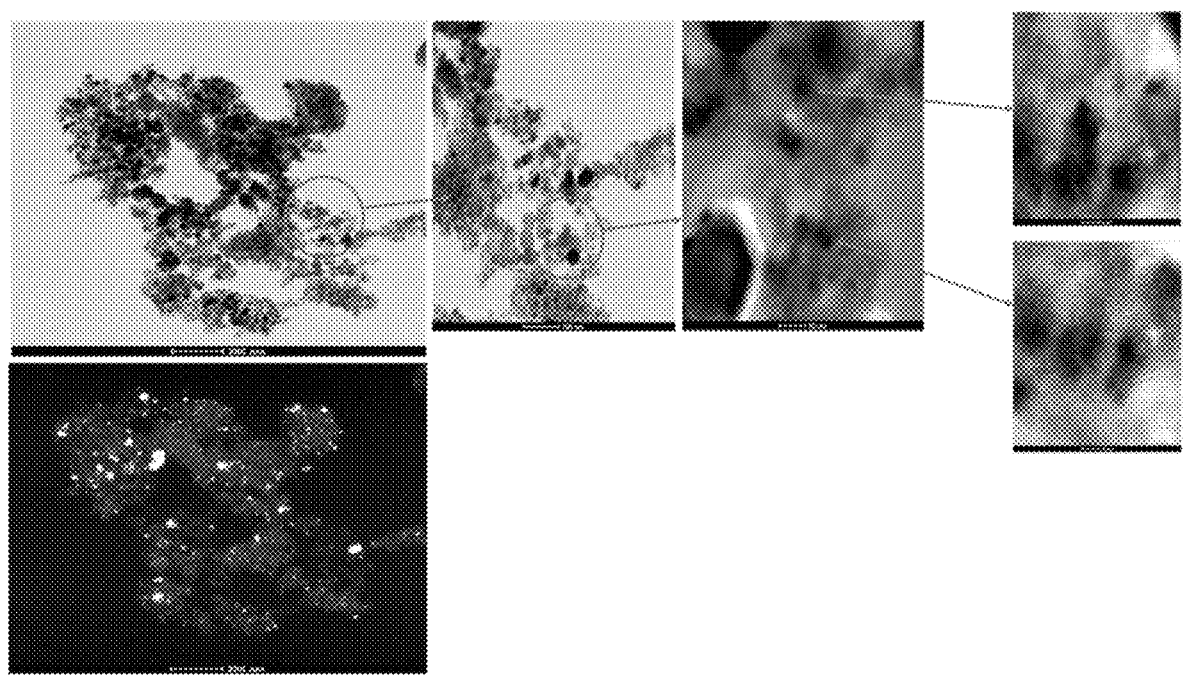
FIG. 5 shows high resolution transmission electron microscopy (HRTEM) analysis of 70 wt % Ni/tetraethyl orthosilicate (TEOS) after calcination at 600° C. The average particle range by HRTEM was 5 to 15 nm, though larger chunks in the range of 20 to 50 nm were also observed. Bright field imaging revealed uniform distribution of NiO nanoparticles in the silica matrix. Higher magnification of larger particles revealed a combination of smaller nanoparticles, suggesting that these particles formed as a result of agglomeration due to calcination at 600° C. The average particle size of calcined sample per XRD was 15.4 nm.
Figure 6:
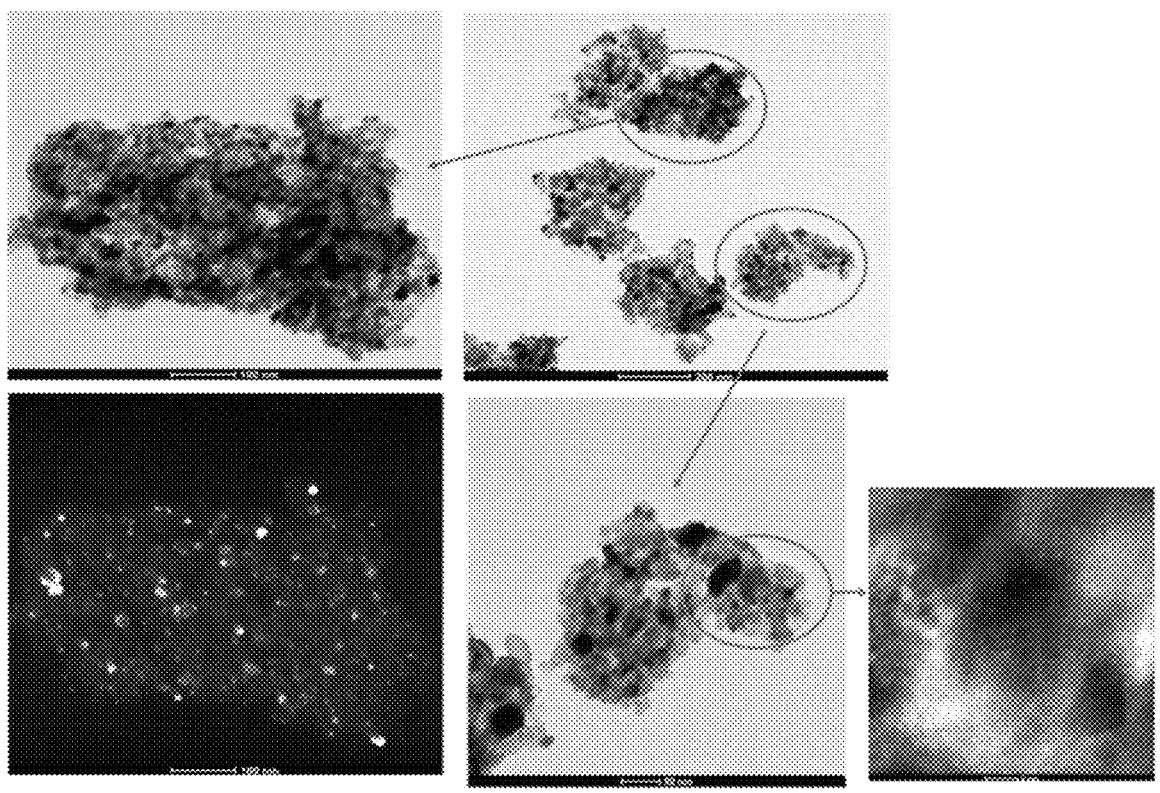
FIG. 6 provides an HRTEM analysis of 70 wt % Ni/fumed silica after calcination at 600° C. The average particle range by HRTEM was 5 to 25 nm, though larger chunks in the range of 20 to 50 nm were also observed. Bright field imaging revealed uniform distribution of NiO nanoparticles in the silica matrix. On average, the NiO particles were slightly bigger than NiO/TEOS and inline with XRD.

HRTEM analysis of the materials synthesized affirmed the findings from XRD analysis. As demonstrated in FIGS. 5 and 6, the high resolution transmission electron microscopy images revealed that the average metal particle size for 70 wt % Ni/TEOS and 70 wt % Ni/TEOS was in the range between 5 and 15 nm and between 5 and 25 nm, respectively. The average metal oxide particle size was calculated using the ImageJ tool and taking a minimum of 40 particles into consideration. Bright field imaging revealed uniform distribution of NiO nanoparticles in the silica matrix.

The particle size of nickel oxide was affected by the metal loading of the experiment. For example, using TEOS as silica source, an experiment with 10 wt % NiO loading produced an average metal nanoparticle size of 3 nm, while 70 wt % loading of NiO produced an average nanoparticle size of 10 nm.

The source of silica (TEOS vs. fumed silica) also had an influence on the state of the nickel oxide nanoparticles in the resulting nanocomposite. Even at a high metal loading of around 70 wt %, an average NiO particle size of about 8 nm (using TEOS) and 12 nm (using fumed silica) was achieved, as identified from XRD using Scherer's equation.

Figure 7:
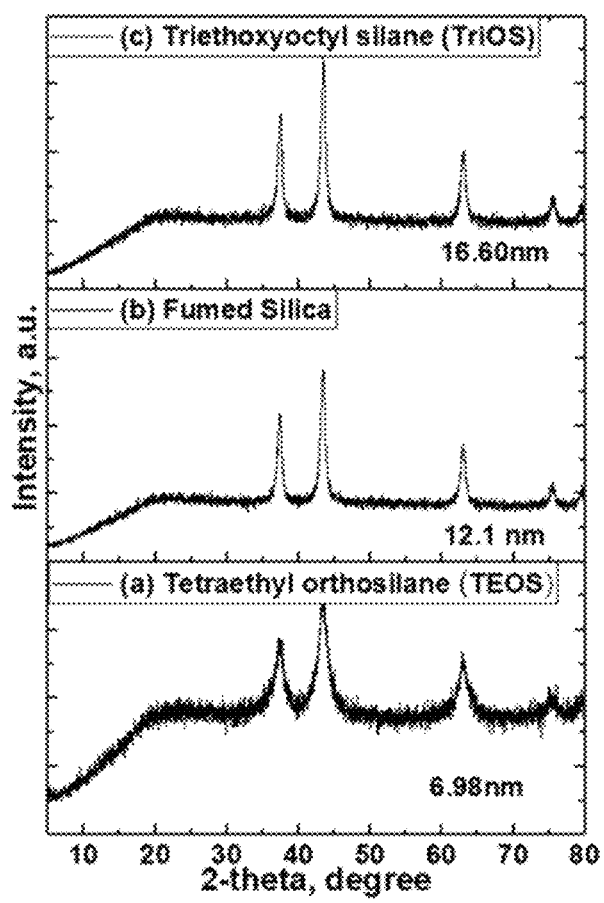
FIG. 7 demonstrates the synthesis of $Ni/SO_2$ nanocomposites with different metal particle sizes prepared using different silica sources: TriOS (triethoxy octyl silane), TEOS (tetraethyl orthosilicate), and fumed silica. These samples were prepared at 70 wt % Ni with a G/N ratio of 0.085 and with propanol as the solvent.

As shown in FIG. 7, the synthesis of $Ni/SO_2$ nanocomposites with different metal particle sizes prepared using TriOS (triethoxy octyl silane), TEOS, and fumed silica as silica sources provided average particle sizes of 16.60 nm, 12.1 nm, and 6.98 nm, respectively. The example was prepared with 70 wt % Ni at a G/N ratio of 0.085 and with propanol as the solvent.

Figure 8:
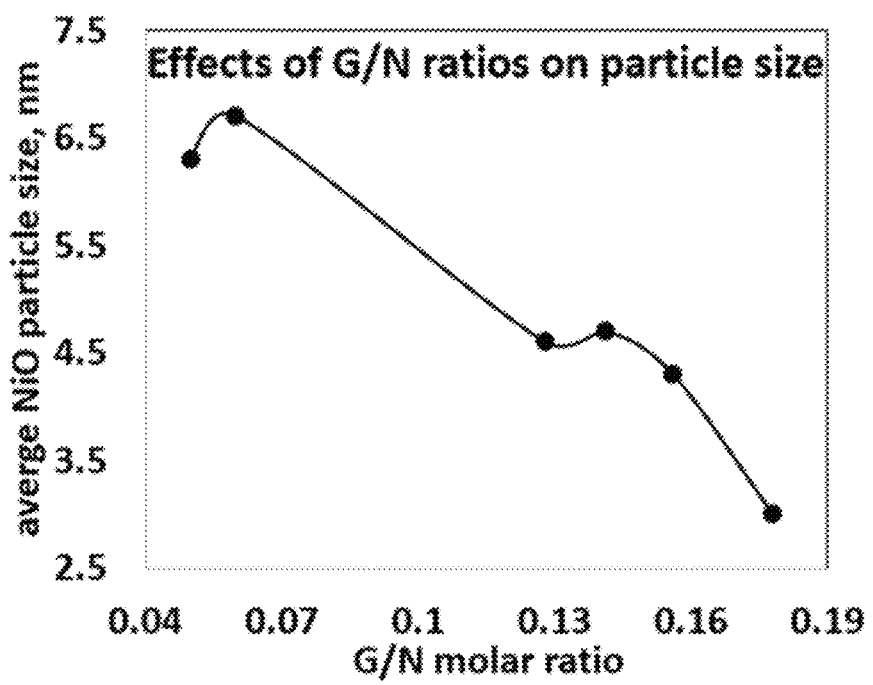
FIG. 8 demonstrates the synthesis of $Ni/SO_2$ nanocomposites with different metal particle sizes prepared at different G/N ratios.
Figure 9:
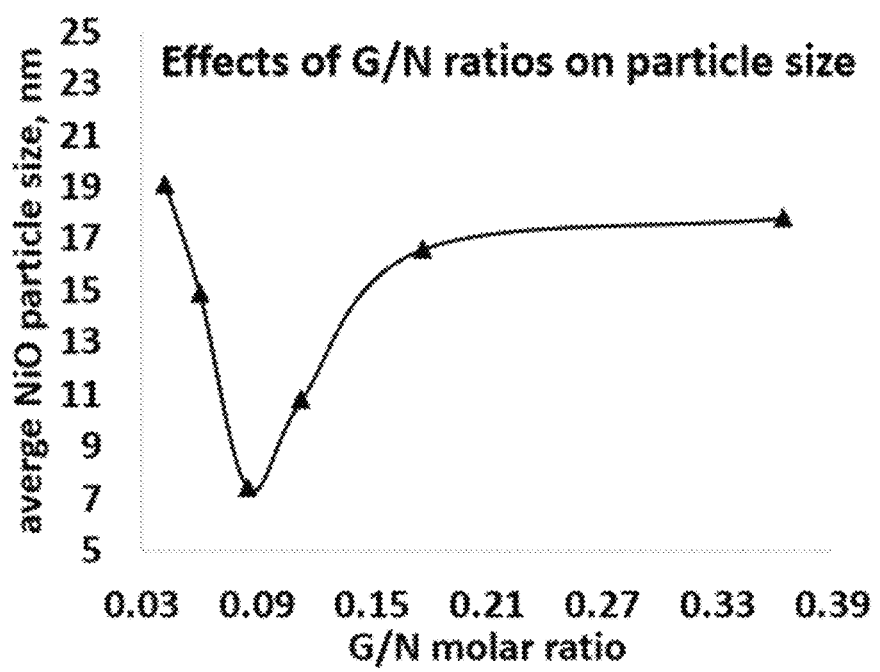
FIG. 9 demonstrates the synthesis of $Ni/SO_2$ nanocomposites with different metal particle sizes prepared at different G/N ratios.
Figure 10:
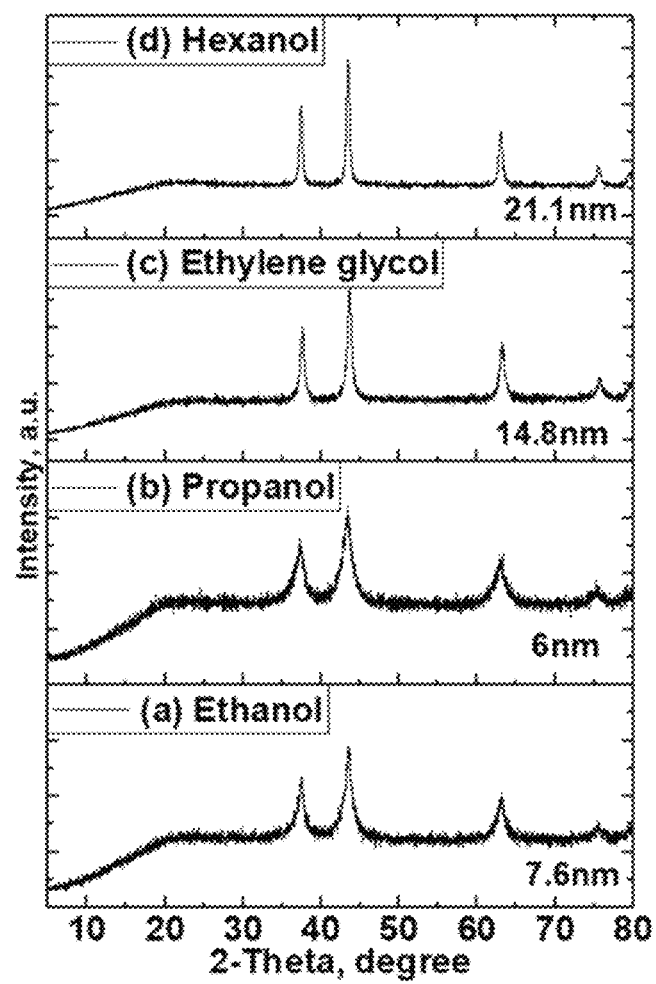
FIG. 10 shows synthesis of $Ni/SO_2$ nanocomposites with different metal particle sizes prepared using different alcohols: (a) ethanol, (b) propanol, (c) ethylene glycol, and (d) hexanol.

As shown in FIGS. 8, 9, and 10, the fuel:oxidant ratio (e.g., glycine:nitrate) and the alcohol were also found to influence the overall particle size and state of NiO.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

All publications and patent, applications cited in this specification are herein incorporated by reference as if each individual publication or patent application were specifically and individually indicated to be incorporated by reference.

What is claimed:

1. A method of fabricating a silica matrix comprising dispersed nickel oxide nanoparticles, the method comprising:
heating a combustion synthesis solution to form a gel, wherein the combustion synthesis solution comprises a silica source, a metal precursor salt, a fuel, and an alcohol;
heating the gel to form a crude silica matrix; and
calcining the crude silica matrix;
wherein the method is a single step combustion synthesis; and wherein the fuel is selected from the group consisting of glycine, urea, hydrazine, a hydrazide, a glycol, and citric acid.

2. The method of claim 1, wherein the fuel is glycine.

3. The method of claim 1, wherein the single step combustion synthesis is in a batch size of 10 to 30 g.

4. The method of claim 1, further comprising:
combining a first solution and a second solution to form the combustion synthesis solution, wherein the first solution comprises the silica source and the alcohol, and wherein the second solution comprises the metal precursor salt and the fuel.

5. The method of claim 1, wherein the silica source is an orthosilicate alkyl ester, an alkoxide organosilane, or a silica particulate.

6. The method of claim 5, wherein the orthosilicate alkyl ester is tetraethyl orthosilicate.

7. The method of claim 5, wherein the silica particulate is fumed silica.

8. The method of claim 1, wherein the metal precursor salt is nickel nitrate hexahydrate.

9. The method of claim 1, wherein the alcohol is selected from the group consisting of methanol, ethanol, ethylene glycol, n-propanol, isopropanol, and hexanol.

10. The method of claim 9, wherein the alcohol is n-propanol.

11. The method of claim 1, wherein the heating of the combustion synthesis solution is at about 110° C.

12. The method of claim 1, wherein the calcining is at about 600° C.

13. The method of claim 1, wherein the silica matrix has a loading of nickel oxide from about 5 to 85 wt %.

14. The method of claim 13, wherein the loading of nickel oxide is from about 10 to 70% wt %.

15. The method of claim 1, wherein the dispersed nickel oxide nanoparticles have an average particle size of from about 2 nm to 40 nm.

16. The method of claim 15, wherein the average particle size is from about 3 nm to 15 nm.

17. The method of claim 1, wherein the combustion synthesis solution includes a weight ratio of fuel to the metal precursor salt of from about 0.04 to 0.4.

18. The method of claim 1, wherein the weight ratio of fuel to the metal precursor salt is about 0.85.

19. A nanocomposite composition comprising a silica matrix and nickel oxide nanoparticles, wherein the nickel oxide nanoparticles are dispersed in the silica matrix, and wherein the nanocomposite composition is prepared by the method of claim 1.

20. A method of fabricating a silica matrix comprising dispersed nickel oxide nanoparticles, the method comprising:
heating a combustion synthesis solution to form a gel, wherein the combustion synthesis solution comprises a silica source, a metal precursor salt, a fuel, and an alcohol;
heating the gel to form a crude silica matrix; and
calcining the crude silica matrix;
wherein the fuel is selected from the group consisting of glycine, urea, hydrazine, a hydrazide, a glycol, and citric acid.

21. The method of claim 20, wherein the fuel is glycine.

* * * * *